US012002923B2

(12) United States Patent
Wang et al.

(10) Patent No.: US 12,002,923 B2
(45) Date of Patent: Jun. 4, 2024

(54) INTUMESCENT BATTERY PAD

(71) Applicant: ROGERS CORPORATION, Chandler, AZ (US)

(72) Inventors: Wei Wang, Waltham, MA (US); Brett Kilhenny, Mystic, CT (US); Robert Daigle, Paradise Valley, AZ (US); Mark St. Jean, Moosup, CT (US); Christopher Churchill, Dayville, CT (US)

(73) Assignee: ROGERS CORPORATION, Chandler, AZ (US)

( * ) Notice: Subject to any disclaimer, the term of this patent is extended or adjusted under 35 U.S.C. 154(b) by 384 days.

(21) Appl. No.: 16/892,566

(22) Filed: Jun. 4, 2020

(65) Prior Publication Data

US 2020/0388810 A1  Dec. 10, 2020

Related U.S. Application Data

(60) Provisional application No. 62/859,230, filed on Jun. 10, 2019.

(51) Int. Cl.
*H01M 10/658* (2014.01)
*H01M 10/0525* (2010.01)
(Continued)

(52) U.S. Cl.
CPC ..... *H01M 10/0525* (2013.01); *H01M 10/658* (2015.04); *H01M 10/659* (2015.04);
(Continued)

(58) Field of Classification Search
CPC ........... H01M 10/658; H01M 10/0525; H01M 10/6235; H01M 10/659; H01M 50/293;
(Continued)

(56) References Cited

U.S. PATENT DOCUMENTS

| 3,639,299 A | 2/1972 | Macdowall |
| 3,803,063 A | 4/1974 | Krentz, Jr. |

(Continued)

FOREIGN PATENT DOCUMENTS

| CA | 705937 A | 3/1965 |
| CN | 105742755 B | 4/2018 |

(Continued)

OTHER PUBLICATIONS

International Search Report; International Application No. PCT/US2020/036050; International Filing Date: Jun. 4, 2020; dated Sep. 18, 2020; 5 pages.

(Continued)

*Primary Examiner* — Jeremiah R Smith
(74) *Attorney, Agent, or Firm* — CANTOR COLBURN LLP

(57) ABSTRACT

In an aspect, an intumescent battery pad for a lithium ion battery comprises a polyurethane foam having a compression force deflection of 5 to 1,035 kilopascals at 25% deflection determined in accordance with ASTM D3574-17; and an intumescent material comprising an acid source, a carbon source, and a blowing agent; wherein the intumescent battery pad has a UL-V0 rating at a thickness of 1 millimeter. In another aspect, a battery can comprise at least two battery cells; and an intumescent battery pad located in between the at least two battery cells.

20 Claims, 4 Drawing Sheets

(51) Int. Cl.
  *H01M 10/659* (2014.01)
  *H01M 50/209* (2021.01)
  *H01M 50/24* (2021.01)
  *H01M 50/293* (2021.01)
  *H01M 50/489* (2021.01)

(52) U.S. Cl.
  CPC ......... *H01M 50/209* (2021.01); *H01M 50/24* (2021.01); *H01M 50/293* (2021.01); *H01M 50/489* (2021.01)

(58) Field of Classification Search
  CPC ............. H01M 10/052; H01M 50/209; H01M 50/411; H01M 50/24; H01M 50/489
  See application file for complete search history.

(56) References Cited

U.S. PATENT DOCUMENTS

| | | |
|---|---|---|
| 3,868,346 A | 2/1975 | Merrill |
| 3,912,650 A | 10/1975 | Khalid et al. |
| 4,757,094 A | 7/1988 | Teumac et al. |
| 4,833,190 A | 5/1989 | Cella et al. |
| 7,306,870 B2 | 12/2007 | Gilicinski et al. |
| 7,749,911 B2 | 7/2010 | Wu et al. |
| 8,057,957 B2 | 11/2011 | Gilicinski et al. |
| 8,263,254 B2 | 9/2012 | Mehta et al. |
| 8,663,774 B2 | 3/2014 | Fernando et al. |
| 8,729,155 B2 | 5/2014 | Wierzbicki et al. |
| 9,012,062 B2 | 4/2015 | Smith et al. |
| 9,716,296 B2 | 7/2017 | Wayne et al. |
| 9,853,267 B2 | 12/2017 | Page et al. |
| 10,158,102 B2 | 12/2018 | Wu et al. |
| 10,483,507 B2 | 11/2019 | Gerundt et al. |
| 10,587,019 B2 | 3/2020 | Wayne et al. |
| 11,702,346 B2 | 7/2023 | Evans et al. |
| 2005/0170238 A1 | 8/2005 | Abu-Isa et al. |
| 2011/0192564 A1 | 8/2011 | Mommer et al. |
| 2015/0017856 A1 | 1/2015 | Davis et al. |
| 2015/0325826 A1 | 11/2015 | Verhaag et al. |
| 2017/0077468 A1 | 3/2017 | Gerundt et al. |
| 2017/0127748 A1* | 5/2017 | Sethumadhavan ..... B32B 5/245 |
| 2017/0214103 A1 | 7/2017 | Onnerud et al. |
| 2017/0301968 A1 | 10/2017 | Cooney et al. |
| 2017/0313941 A1 | 11/2017 | Atluri et al. |
| 2021/0008970 A1* | 1/2021 | Deindl ..................... B60K 1/04 |
| 2021/0257690 A1 | 8/2021 | Kilhenny et al. |
| 2021/0288362 A1 | 9/2021 | Churchill |
| 2021/0316537 A1 | 10/2021 | Adam, Jr. et al. |
| 2022/0010085 A1* | 1/2022 | Orikasa ..................... C08K 3/26 |
| 2022/0145097 A1* | 5/2022 | Ma ....................... H01M 50/121 |
| 2022/0388291 A1 | 12/2022 | Wang et al. |
| 2022/0389152 A1 | 12/2022 | Wang et al. |
| 2022/0410528 A1 | 12/2022 | Wang et al. |
| 2023/0032529 A1 | 2/2023 | Evans et al. |

FOREIGN PATENT DOCUMENTS

| | | |
|---|---|---|
| CN | 112358731 A | 2/2021 |
| EP | 2745348 B1 | 7/2017 |
| EP | 3170222 B1 | 1/2020 |
| GB | 1534408 | 12/1978 |
| JP | 2018206605 A | 12/2018 |
| JP | 2019096410 A | 6/2019 |
| KR | 20070030695 | 3/2007 |
| WO | 2010109218 A1 | 9/2010 |
| WO | 20150017856 A1 | 11/2015 |
| WO | 2017139826 A1 | 8/2017 |
| WO | 2020047059 A1 | 3/2020 |
| WO | 2020221808 A1 | 11/2020 |
| WO | 2020251825 A1 | 12/2020 |

OTHER PUBLICATIONS

Written Opinion; International Application No. PCT/US2020/036050; International Filing Date: Jun. 4, 2020; dated Sep. 18, 2020; 8 pages.

Hamdani et al., "Flame Retardancy of Silicone-Based Materials", Polmer Degradation and Stability 94 (2009) pp. 465-495.

Norseal FS1000 Series, Intumescent, Airtight, Watertight and Resilient Sealing Foam;, retrieved from www.tapesolutions.saint-gobain.com on Jan. 22, 2021; 2 pages.

Song et al., "Effects of Inorganics on Thermal Property of Dolicone Rubber Composites", 21st International Conferenc on Composite Materials Xi'an, Aug. 20-25, 2017; 10 pages.

* cited by examiner

INTUMESCENT BATTERY PAD

CROSS-REFERENCE TO TECHNICALLY RELATED APPLICATION

This application claims the benefit of U.S. Provisional Patent Application Ser. No. 62/859,230 filed Jun. 10, 2019. The related application is incorporated herein in its entirety by reference.

TECHNICAL FIELD

This application relates to an intumescent battery pad, a battery assembly, and in particular to a battery assembly including an intumescent battery pad that can be used in lithium ion batteries.

BACKGROUND

The demand for electrochemical energy storage devices, such as lithium-ion batteries, is increasing due to the growth of applications such as electric vehicles and grid energy storage systems, as well as other multi-cell battery applications, such as electric bikes, uninterrupted power battery systems, and lead acid replacement batteries. For large format applications, such as grid storage and electric vehicles, multiple cells connected in series and parallel arrays are often used. Such cells can be large (for example, having at least 10 Ampere hours (Ah)). An ongoing issue for large cells is safety, as the energy released in a cell going into thermal runaway is proportional to the amount of electrolyte and active materials that reside inside the cell and that are accessible during thermal runaway. In other words, because larger cells contain a greater amount of the electrolyte and active material, thermal runaway can result in a more intense fire. In addition, once a large cell is in thermal runaway mode, the heat produced by the cell can induce a thermal runaway propagation reaction in adjacent cells, causing a cascading effect igniting the entire pack, resulting in destruction to the pack and surrounding equipment, as well as potentially unsafe conditions for users.

While attempts to reduce the flammability of such batteries have been considered, they are not without their drawbacks. For example, modifying the electrolyte by adding flame retardant additives or by using inherently non-flammable electrolytes have been considered, but these attempts can negatively impact the electrochemical performance of the lithium ion battery cell. Other approaches to prevent cascading thermal runaway have involved incorporating an increased amount of insulation between cells or clusters of cells in order to reduce the amount of thermal heat transfer during a thermal event. These approaches can limit the upper bounds of the energy density that can be achieved.

With the increasing demand for batteries with high energy densities, there is an increasing risk for flame occurrence and propagation. There is accordingly a need in the art for batteries that can meet or exceed current flame safety standards. It would be a further advantage if the batteries can also function at the desired higher energies.

BRIEF SUMMARY

Disclosed herein is an intumescent battery pad for a lithium ion battery, comprising a polyurethane foam having a compression force deflection of 5 to 1,035 kilopascal at 25% deflection determined in accordance with ASTM D3574-17; and an intumescent material comprising an acid source, a carbon source, and a blowing agent; wherein the intumescent battery pad has a UL-V0 rating at a thickness of 1 millimeter.

Also disclosed is a method of making the intumescent battery pad comprising: coating a frothed composition comprising a reactive mixture onto a release liner; curing the reactive mixture to form the polyurethane foam; and wherein the frothed composition comprises the intumescent material, or wherein the method further comprises depositing the intumescent material on at least one surface of the polyurethane foam to form the intumescent battery pad.

A further disclosed method of making the intumescent battery pad comprises depositing the intumescent material on the polyurethane foam.

Also disclosed herein is a battery assembly, comprising: at least two battery cells and an intumescent battery pad located in between the at least two battery cells or along a surface proximate to the battery assembly; wherein the intumescent battery pad comprises a polyurethane foam and an intumescent material layer on the polyurethane foam.

Additionally disclosed is a battery assembly and a battery comprising the intumescent battery pad.

The above described and other features are exemplified by the following figures, detailed description, and claims.

BRIEF DESCRIPTION OF THE DRAWINGS

The following figures are exemplary embodiments, which are provided to illustrate the present disclosure. The figures that are illustrative of the examples are not intended to limit devices made in accordance with the disclosure to the materials, conditions, or process parameters set forth herein.

DETAILED DESCRIPTION

The issue of thermal runaway in batteries that include a plurality of cells is a difficult problem because cells adjacent to a cell experiencing a thermal runaway can absorb enough energy from the event to cause them to be triggered to also enter thermal runaway. This propagation of initiating a thermal runaway event can result in a chain reaction, in which storage devices enter into a cascading series of thermal runaways as the cells ignite adjacent cells.

In order to prevent such cascading thermal runaway events from occurring, a battery assembly including at least two battery cells and an intumescent battery pad was developed. The intumescent battery pad comprises a polyurethane foam and an intumescent material. The intumescent material comprises an acid source, a carbon source, and a blowing agent. The intumescent material can be dispersed in the polyurethane foam or can be present on at least one surface of the polyurethane foam. The fact that the intumescent battery pad could be successfully used in a battery pack was surprising as it was thought that the inherent expansion of the intumescent material during a char event would have been too significant for use in a battery back. It was further surprising that the intumescent material could be successfully coated onto the intumescent battery pad, while maintaining the desired foam properties of the polyurethane, as it was expected that the addition of the coating would have adversely affected properties such as the compression force deflection or the compression set of the polyurethane foam.

As stated above, the battery assemblies include at least two battery cells and the intumescent battery pad, which can be located in between the at least two battery cells or which can be located along a surface proximate to the battery assembly. The battery cells can be lithium ion battery cells. The particular shape of the cells and the intumescent battery pad can vary widely, depending on the desired size or shape of the cells, the size or conformation of the case or other structure encasing the cells, the cost of manufacture, the ease of manufacture of various shapes, and like considerations, although effectiveness in thermal shielding can be a primary consideration. For example, the battery cells can have a circular, square, rectangular, ovoid, trapezoidal, or other shaped perimeter, and the intumescent battery pad can have a corresponding circular, square, rectangular, ovoid, trapezoidal, or other shaped perimeter. Alternatively, the shape of the perimeter of at least one of the battery cells can perimeters of different that the perimeter of the pad. For example, cells having circular perimeter can be used with an intumescent battery pad having a rectangular perimeter.

Figure 1:
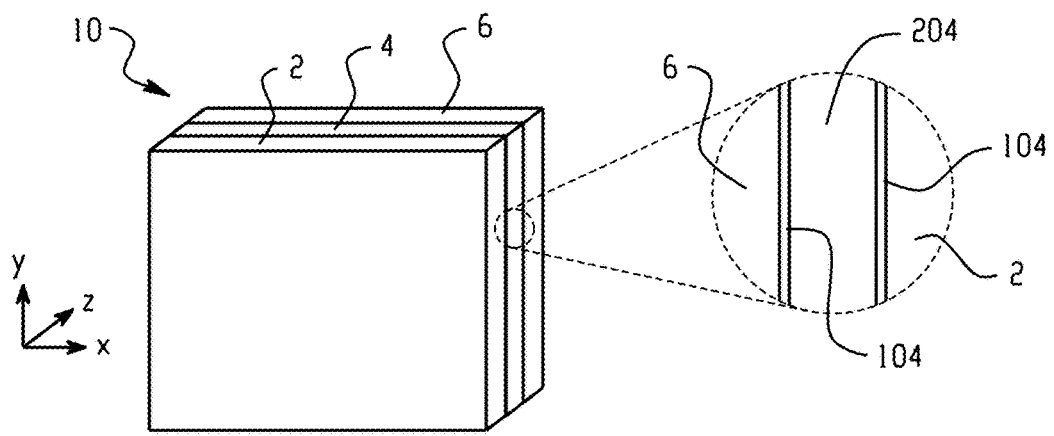
FIG. 1 is an illustration of an aspect of a battery assembly including an intumescent battery pad located in between two battery cells.

FIGS. 1 to 4 illustrate exemplary embodiments of battery assemblies. FIG. 1 shows a battery assembly 10 wherein the intumescent battery pad 4 is located in between a first battery cell 2 and a second battery cell 6. The inset in FIG. 1 illustrates that that the intumescent battery pad 4 can include a polyurethane layer 204 in direct physical contact with intumescent layers 104. FIG. 1 further illustrates that the intumescent battery pad 4 can be approximately the same size as the battery cells, particularly with regard to spanning the width and height of the battery cells. For example, as shown in FIG. 1, the width in the x-direction and the height in the y-direction can be the same. In other aspects, the width and height of the intumescent battery pad 4 can be within plus or minus (±) 0.2%, or ±0.5%, or ±1%, or ±2%, or ±3%, or ±5%, or ±10% of the width and height of at least one, and preferably both, of the battery cells. If battery cells of a different size are used, the width and height of the intumescent battery pad can be same as one of the battery cells, or within ±0.2%, ±0.5%, or ±1%, or ±2%, or ±3%, or ±5% or ±10% of the width and height of one of the battery cells. In an aspect, particularly for assemblies having a circular or other non-square shape, the perimeter (measured as a length) can be within ±0.2%, ±0.5%, or ±1%, or ±2%, or ±3%, or ±5% or ±10% of the perimeter of at least one, preferably both, of the battery cells.

Figure 2:
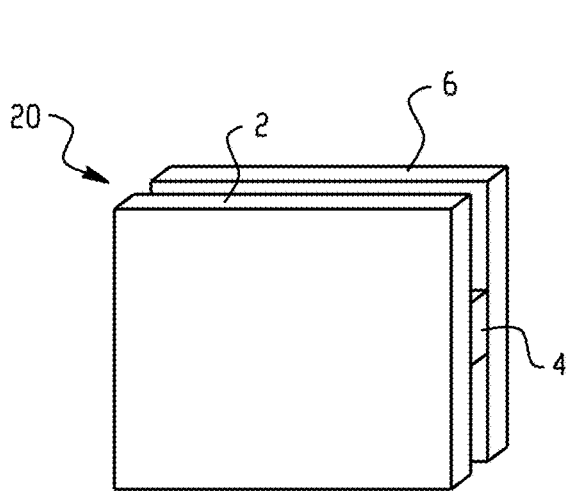
FIG. 2 is an illustration of another aspect of a battery assembly including an intumescent battery pad located in between two battery cells.

Variations in the size of the intumescent battery pad is not limited to these amounts, however. Variation in at least one of the width in the x-direction and the height in the y-direction can be made. FIG. 2 illustrates a battery assembly 20 wherein the intumescent battery pad 4 can be smaller than the respective battery cells in at least one direction. As shown in FIG. 2, the width in the x-direction of the intumescent battery pad 4 is the same as the width of the battery cells 2, 6, but the height in the y direction of the intumescent battery pad 4 is significantly less that the height of the battery cells 2, 6. In other aspects both the width and the height can be different than the battery cells 2, 6.

Figure 3:
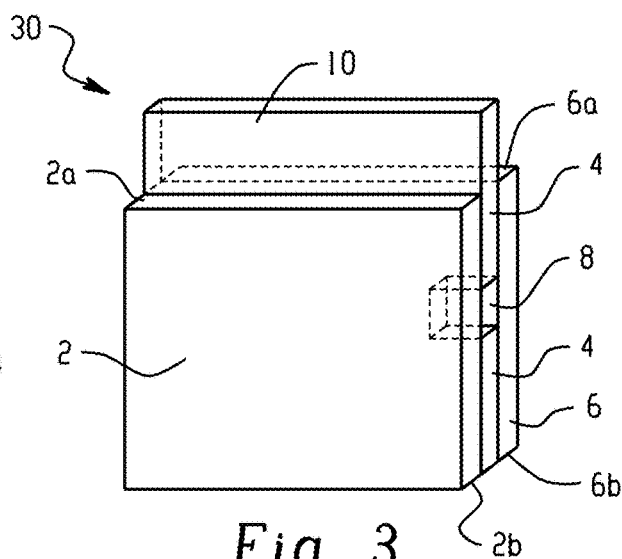
FIG. 3 is an illustration of an aspect of a battery assembly including an intumescent battery pad located in between an array of battery cells.

It is also possible for the intumescent battery pad to vary along only a portion of a perimeter of one or more of the battery cells. In this aspect the perimeter of the battery pad is not even (not coterminal) with all edges of at least one battery cell. For example, as shown in FIG. 3, battery assembly 40 includes battery cells 2, 6 having the same size perimeters. Intumescent battery pad 4 is disposed between battery cells 2, 6. At edges 2*b*, 6*b* of cells 2, 6, battery pad 4 is even with (coterminal with) edges 2*b*, 6*b*. However, a portion 8 of intumescent battery pad 4 is cut away to leave a notch in the pad. The notch can be used for ready insertion of another component of the battery, for example. At edges 2*a*, 6*a* of cells 2, 6, edge 10 of battery pad 4 extends beyond edges 2*a*, 6*a*, forming a tab or a flap. This extra material can be used, for example, for additional coverage of a battery cell or for filling a space between a battery cell and another structure in the battery, for example a casing of the battery. Any one or combination of the above-described features can be present in the battery assembly.

Figure 4:
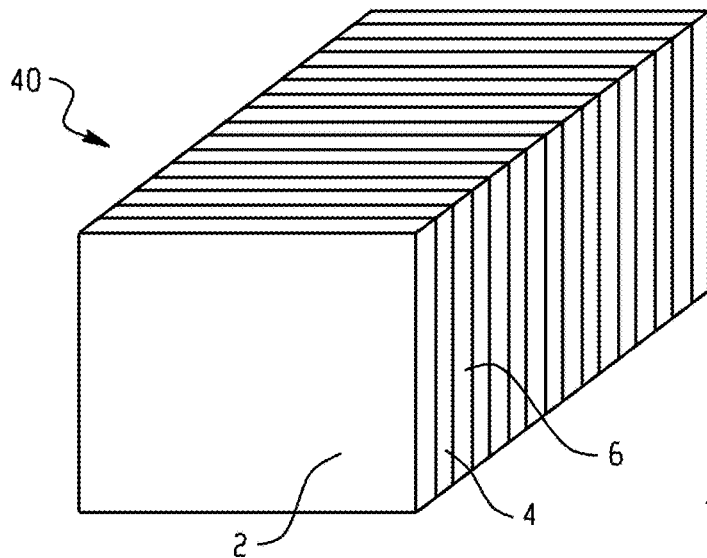
FIG. 4 is an illustration of an aspect of a battery assembly including intumescent battery pads located in between battery cells in an array of battery cells.

FIG. 4 illustrates a battery assembly 40 including an array of battery cells arranged in a stack. Battery assembly 40 can comprise multiple battery cells 2, 6, with multiple intumescent battery pads 4 located in between the respective battery cells. The battery assembly can comprises a stack of 2 to 100, or 10 to 50 battery cells, wherein the intumescent battery pad 4 is located in between at least two of the battery cells. Preferably the intumescent battery pad 4 is located between each of the battery cells in the stack.

Figure 5:
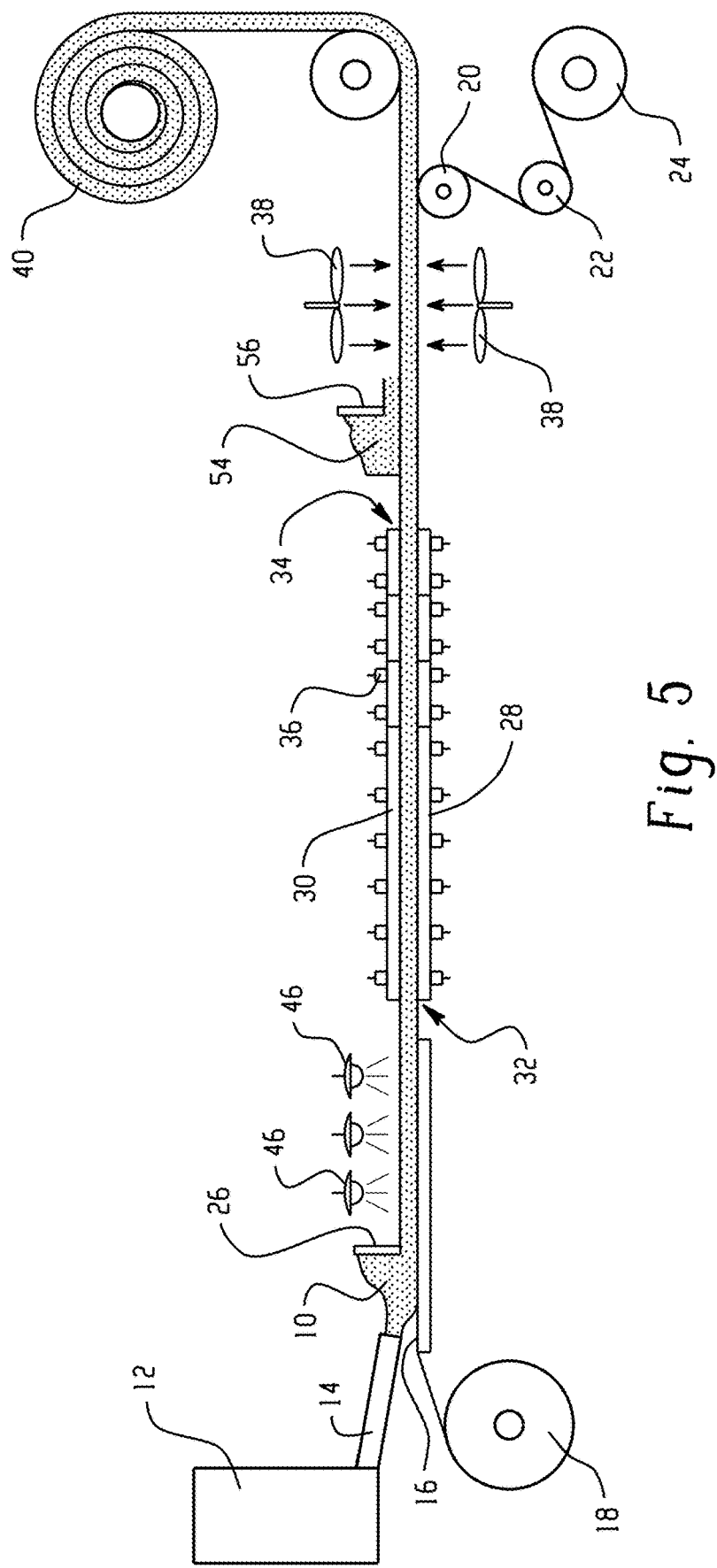
FIG. 5 is an illustration of an aspect of a battery including an array of battery cells.

FIG. 5 illustrates a battery including a battery assembly 40. The battery can include a top casing 100 and a bottom casing 150. The top casing 100 and the bottom casing 150 can form a housing that surrounds the battery assembly. The top casing 100 and the bottom casing 150 can form a tight seal that can be enhanced by the presence of gasket 110. It is noted that the housing is not limited to the figure and that various other configurations are considered. A foam layer 120 can be located on one or more sides of the battery assembly 40. The foam layer 120 can be an intumescent battery pad as disclosed herein. The foam layer 120 can be located along a surface proximate to the battery assembly 40. A major axis of the foam layer 120 can be perpendicular to a major axis of the battery cells 2 and 6. For example, a planar surface of the foam layer 120 can be in the x-z plane and a planar surface of the battery cells 2, 6 can be in the x-y plane. The battery can include a thermal management assembly, for example, including a thermal interface layer 130 and a cooling plate 140.

The intumescent material comprises an acid source, a blowing agent, and a carbon source. Each of these components can be present in separate layers or as an admixture, preferably an intimate admixture. For example, the intumescent material can comprise a polyphosphate acid source, a blowing agent, and a pentaerythritol carbon source. Without being bound by theory, it is believed that the intumescent material can reduce the spread of flames using two energy absorbing mechanisms, including forming a char and then swelling the char. For example, as the temperature reaches a value, for example, of 200 to 280° C., the acidic species (for example, of the polyphosphate acid) can react with the carbon source (for example, pentaerythritol) to form a char. As the temperature increases, for example, to 280 to 350° C., the blowing agent can then decompose to yield gaseous products that cause the char to swell.

The acid source can comprise at least one of an organic or an inorganic phosphorous compound or an organic or inorganic sulfate (for example, ammonium sulfate) or other compounds. The organic or inorganic phosphorous compound can comprise at least one of an organophosphate or organophosphonate (for example, tris(2,3-dibromopropyl) phosphate, tris(2-chloroethyl)phosphate, tris(2,3-dichloropropyl)phosphate, tris(1-chloro-3-bromoisopropyl) phosphate, bis(1-chloro-3-bromoisopropyl)-1-chloro-3-bromoisopropyl phosphonate, polyaminotriazine phosphate, melamine phosphate, triphenyl phosphate, or guanylurea phosphate); an organophosphite ester (for example, trimethyl phosphite or triphenyl phosphite); a phosphazene (for example hexaphenoxycyclotriphosphazene), a phosphorus-containing inorganic compound (for example, phosphoric acid, phosphorus acid, a phosphite, urea phosphate, or an ammonium phosphate (for example, ammonium monohydrogen phosphate, ammonium dihydrogen phosphate, or ammonium polyphosphate)).

The blowing agent can comprise an agent that decomposes (for example, into smaller compounds such as ammonia or carbon dioxide) at a temperature of greater than or equal to 120° C., for example at 120 to 200° C., or at 130 to 200° C. The blowing agent can comprise at least one of a dicyandiamide, an azodicarbonamide, a melamine, a guanidine, a glycine, a urea (for example, a urea-formaldehyde resin or a methylolated guanylurea phosphate), or a halogenated organic material (for example, a chlorinated paraffin).

The intumescent material can comprise a carbon source, where it is noted that the polyurethane foam itself can function as the carbon source. The carbon source can comprise at least one of dextrin, a phenol-formaldehyde resin, pentaerythritol (for example, a dimer or trimer thereof), a clay, or a polymer (for example, polyamide 6, an amino-poly(imidazoline-amid), or polyurethane). The amino-poly(imidazoline-amid) can comprise repeating amide linkages and imidazoline groups.

The intumescent material can optionally comprise a synergistic compound to further improve the flame retardance of the intumescent material. The synergistic compound can comprise at least one of a boron compound (e.g., zinc borate, boron phosphate, or boron oxide), a silicon compound, an aluminosilicate, a metal oxide (e.g., magnesium oxide, ferric oxide, or aluminum oxide hydrate (boehmite)), or a metal salt (e.g. alkali metal or alkaline earth metal salts of organosulfonic acids or alkaline earth metal carbonates). Preferred synergistic combinations include phosphorus-containing compounds with at least one of the foregoing.

The intumescent material can optionally further comprise a binder. The binder can comprise at least one of an epoxy, a polysulfide, a polysiloxane, a polysilarylene. The binder can be present in the intumescent material in an amount of less than or equal to 50 wt %, or 5 to 50 wt %, or 35 to 45 wt %, based on the total weight of the intumescent material. The binder can be present in the intumescent material in an amount of 5 to 95 wt %, or 40 to 60 wt % based on the total weight of the intumescent material.

The intumescent battery pad comprises a polyurethane foam. In general, polyurethane foams are formed from reactive compositions comprising an organic isocyanate component reactive with an active hydrogen-containing component(s), a surfactant, and a catalyst. The organic isocyanate components used in the preparation of polyurethane foams comprise polyisocyanates having the general formula: $Q(NCO)_i$, wherein i is an integer having an average value of two or greater, and Q is an organic radical having a valence of i. Q can be a substituted or unsubstituted group (for example, an alkane or an aromatic group of the appropriate valency). Q can be a group having the formula $Q^1$-Z-$Q^1$ wherein $Q^1$ is an alkylene or arylene group and Z is —O—, —O-$Q^1$-S—, —CO—, —S—, —S-$Q^1$-S—, —SO—, or —SO$_2$—. Q can represent a polyurethane radical having a valence of i.

Examples of suitable isocyanates include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4, 4', 4"-triisocyanate, isopropylbenzene-alpha-4-diisocyanate, or polymeric isocyanates such as polymethylene polyphenylisocyanate.

The active hydrogen-containing component can comprise a polyol (for example, at least one of a polyether polyol or a polyester polyol). Suitable polyester polyols are inclusive of polycondensation products of polyols with dicarboxylic acids or ester-forming derivatives thereof (such as anhydrides, esters and halides), polylactone polyols obtainable by ring-opening polymerization of lactones in the presence of polyols, polycarbonate polyols obtainable by reaction of carbonate diesters with polyols, or castor oil polyols. Suitable dicarboxylic acids and derivatives of dicarboxylic acids that are useful for producing polycondensation polyester polyols are aliphatic or cycloaliphatic dicarboxylic acids such as glutaric, adipic, sebacic, fumaric or maleic acids; dimeric acids; aromatic dicarboxylic acids such as phthalic, isophthalic or terephthalic acids; tribasic or higher functional polycarboxylic acids such as pyromellitic acid; as well as anhydrides or second alkyl esters, such as maleic anhydride, phthalic anhydride or dimethyl terephthalate.

The polyol can have a hydroxyl number that varies over a wide range. In general, the hydroxyl number of the polyol, including other cross-linking additives, if employed, can be 28 to 1,000, or 100 to 800. The hydroxyl number is defined as the number of milligrams of potassium hydroxide required for the complete neutralization of the hydrolysis product of the fully acetylated derivative prepared from 1 gram of polyol or mixtures of polyols with or without other cross-linking additives.

Methods for the manufacture of foams are generally known. The foams can be mechanically frothed, physically or chemically blown, or both. The polyurethane foams can be made by casting a mechanically frothed composition. In particular, the reactive precursors of the polyurethane can be mixed and mechanically, frothed, then cast to form a layer, and cured.

Physical blowing agents can be used alone or as mixtures with each other or with one or more chemical blowing agents. Physical blowing agents can be selected from a broad range of materials, including hydrocarbons, ethers, esters and partially halogenated hydrocarbons, ethers, and esters, and the like. Typical physical blowing agents have a boiling point of −50 to 100° C., or −50 to 50° C. Exemplary physical blowing agents include CFC's (chlorofluorocarbons) (for example, 1,1-dichloro-1-fluoroethane, 1,1-dichloro-2,2,2-trifluoro-ethane, monochlorodifluoromethane, or 1-chloro-1,1-difluoroethane); FC's (fluorocarbons) (for example, 1,1,1,3,3,3-hexafluoropropane, 2,2,4,4-tetrafluorobutane, 1,1,1,3,3,3-hexafluoro-2-methylpropane, 1,1,1,3, 3-pentafluoropropane, 1,1,1,2,2-pentafluoropropane, 1,1,1, 2,3-pentafluoropropane, 1,1,2,3,3-pentafluoropropane, 1,1, 2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, or pentafluoroethane); FE's (fluoroethers) (for example, methyl-1,1,1-trifluoroethylether or difluoromethyl-1,1,1-trifluoroethylether); or hydrocarbons (for example, n-pentane, isopentane, or cyclopentane). The physical blowing agent can comprise at least one of carbon dioxide, ethane, propane, n-butane, isobutane, pentane, hexane, butadiene, acetone, methylene chloride, any of the chlorofluorocarbons, hydrochlorofluorocarbons, or hydrofluorocarbons. As with the chemical blowing agents, the physical blowing agents can be used in an amount sufficient to give the resultant foam the desired bulk density. Typically, physical blowing agents are used in an amount of 5 to 50 wt %, or 10 to 30 wt % based on the total weight of the reactive composition.

If a chemical blowing agent is used, it can comprise at least one of water, an azo compound (for example, azoisobutyronitrile, azodicarbonamide (i.e. azo-bis-formamide), or barium azodicarboxylate); a substituted hydrazine (for example, diphenylsulfone-3,3'-disulfohydrazide, 4,4'-hydroxy-bis-(benzenesulfohydrazide), trihydrazinotriazine, or aryl-bis-(sulfohydrazide)); a semicarbazide (for example, p-tolylene sulfonyl semicarbazide, or 4,4'-hydroxy-bis-(benzenesulfonyl semicarbazide)); a triazole (for example, 5-morpholyl-1,2,3,4-thiatriazole); an N-nitroso compound (for example, N,N'-dinitrosopentamethylene tetramine or N,N-dimethyl-N,N'-dinitrosophthalmide); benzoxazine (for example, isatoic anhydride); or a mixture (for example, a sodium carbonate/citric acid mixture). The chemical blowing agent can comprise water. The blowing agent can comprise at least one of an ammonium salt, a phosphate, a polyphosphate, a borate, a polyborate, a sulphate, a urea, a urea-formaldehyde resin, a dicyandiamide, or a melamine.

The amount of the foregoing chemical blowing agents will vary depending on the agent and the desired foam density, and is readily determinable by one of ordinary skill in the art. In general, these chemical blowing agents are used in an amount of 0.1 to 10 wt % based on the total weight of the reactive composition. The decomposition products formed during the decomposition process can be physiologically safe, and that may not significantly adversely affect the thermal stability or mechanical properties of the foamed polyurethane sheets.

A number of the catalysts can be used to catalyze the reaction of the isocyanate component with the active hydrogen-containing component. Such catalysts include organic and inorganic acid salts of, or organometallic derivatives of bismuth, lead, tin, iron, antimony, uranium, cadmium, cobalt, thorium, aluminum, mercury, zinc, nickel, cerium, molybdenum, vanadium, copper, manganese, or zirconium, as well as phosphines or tertiary organic amines Examples of such catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N'N'-tetramethyl-1,3-butanediamine, N,N-dimethylethanolamine, N,N-diethylethanolamine, 1,3,5-tris (N,N-dimethylaminopropyl)-s-hexahydrotriazine, o- and p-(dimethylaminomethyl) phenols, 2,4,6-tris(dimethylaminomethyl) phenol, N,N-dimethylcyclohexylamine, pentamethyldiethylenetriamine, 1,4-diazobicyclo [2.2.2] octane, N-hydroxyl-alkyl quaternary ammonium carboxylates and tetramethylammonium formate, tetramethylammonium acetate, or tetramethylammonium 2-ethylhexanoate.

The catalyst can comprise a metal acetyl acetonate, based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc, or zirconium. The catalyst can comprise bis(2,4-pentanedionate) nickel (II) (also known as nickel acetylacetonate or diacetylacetonate nickel) or derivatives thereof such as diacetonitrilediacetylacetonato nickel, diphenylnitrilediacetylacetonato nickel, or bis(triphenylphosphine)diacetyl acetylacetonato nickel. The catalyst can comprise ferric acetylacetonate (FeAA).

The amount of catalyst present in the reactive composition can be 0.03 to 3 wt %, based on the total weight of the active hydrogen-containing component. The reactive composition can comprise acetyl acetone (2,4-pentanedione) that can provide heat latency, allowing for the time for the required mixing, casting and other procedures, and can help to avoid deleterious premature curing during low temperature processing. In general, the weight ratio of the catalyst to acetyl acetone can be 3:1 to 1:1.

The reactive composition can comprise a surfactant that can stabilize the reactive composition before it is cured. The surfactant can comprise an organosilicone surfactant. The organosilicone can comprise a copolymer comprising or consisting essentially of $SiO_2$ (silicate) units and $(CH_3)_3SiO_{0.5}$ (trimethylsiloxy) units in a molar ratio of silicate to trimethylsiloxy units of 0.8:1 to 2.2:1, or 1:1 to 2.0:1. The organosilicone can comprise a partially cross-linked siloxane-polyoxyalkylene block copolymer, wherein the siloxane blocks and polyoxyalkylene blocks are linked by silicon to carbon, or by silicon to oxygen to carbon. The surfactant can be present in an amount of 0.5 to 10 wt %, or 1 to 6 wt % based on the total weight of the active hydrogen component.

Other, optional additives can be added to the reactive composition. For example, the additive can comprise a filler (for example, alumina trihydrate, silica, talc, calcium carbonate, or clay), dyes, pigments (for example, titanium dioxide or iron oxide), antioxidants, antiozonants, UV stabilizers, conductive fillers, or conductive polymers.

Figure 6:
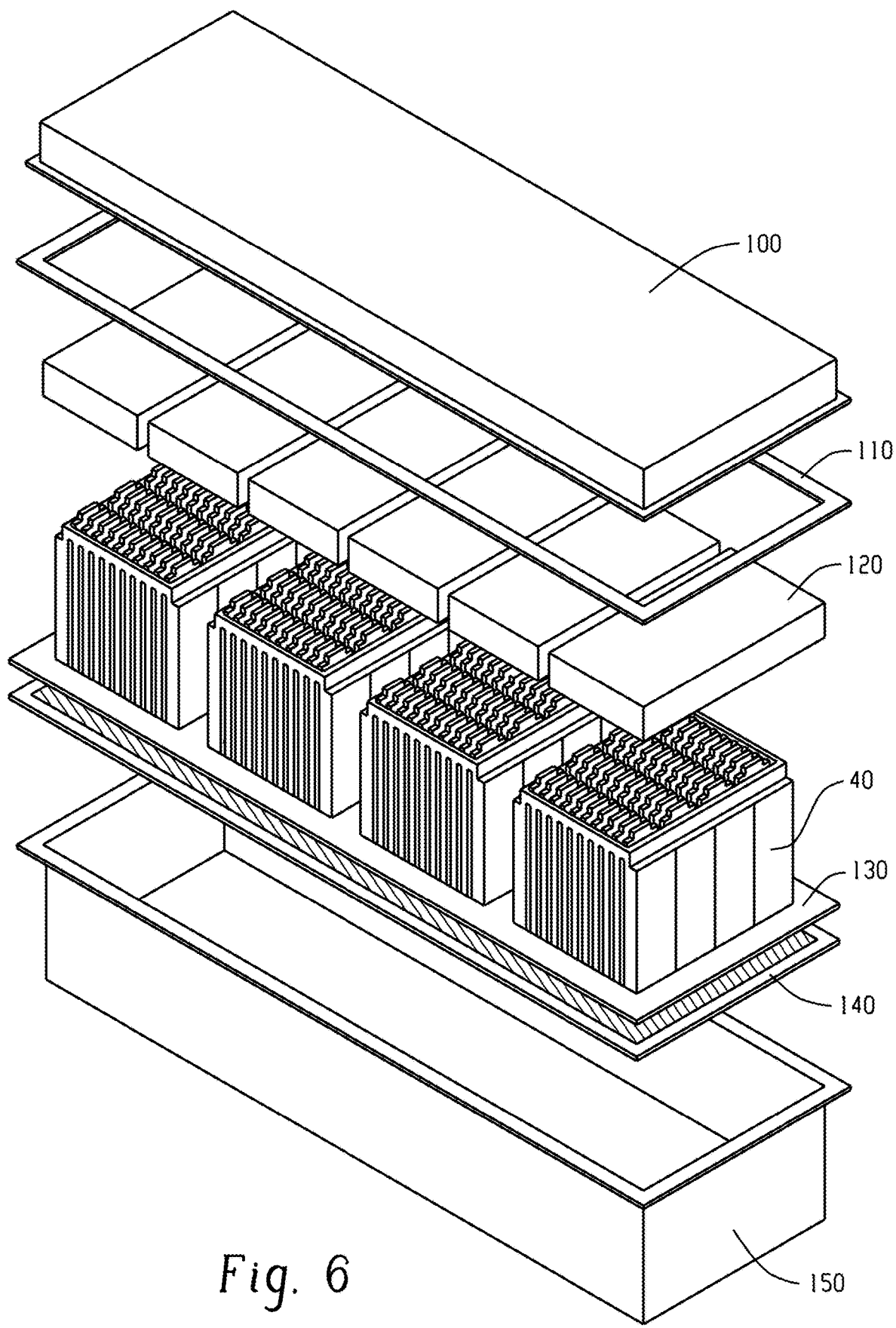
FIG. 6 is an illustration of an aspect of forming an intumescent material.

The polyurethane foam can be produced by mechanically mixing the reactive composition (for example, comprising an isocyanate component, an active hydrogen-containing component, a froth-stabilizing surfactant, a catalyst, and other optional additives) with a froth-forming gas. As shown in FIG. 6, the frothed mixture 10 can be continuously fed from a unit 12 onto a release liner 16, for example, via a conduit 14. The release liner can be played out from a supply roll 18 and can be pulled to the right by rolls 20 and 22 to pass by various stations in the system and can be rewound on take up roll 24. As the release liner 16 is moved to the right with the frothed mixture 10 deposited thereon, the frothed mixture 10 is spread to a layer of desired thickness by a doctoring blade 26 or other suitable spreading device. The doctoring blade 26 spreads the frothed mixture 10 to the desired thickness, for example, 0.1 to 15 millimeters to form a gauged layer.

The gauged layer of the frothed mixture can then be delivered to one or more heating zones, for example, a first heating zone including infrared heaters 46 or a second heating zone including heating platens 28 and 30. Platens 28 and 30 can be parallel and can have an equidistant spacing therebetween along their lengths, or they can be diverging from the entrance 32 to the exit 34. If the upper layer of the foam directly opposite to heating platen 30 is not covered with another layer of release liner, then the spacing between platens 28 and 30 can be greater than the doctored thickness of the layer of foam material and release support 16 so that the unexposed upper surface of the foam does not contact heating platen 30. A temperature of the respective heating zones can each independently be 90 to 250° C. After the heating zone, the formed polyurethane layer can be passed to a cooling zone where it can be cooled by any suitable cooling device such as fans 38. The formed polyurethane layer can then be taken up on roll 40, optionally, after removal of the release liner 16.

The intumescent battery pad comprises a polyurethane foam and an intumescent material. The intumescent material can be dispersed in the polyurethane foam or can be present on at least one surface of the polyurethane foam. When the intumescent material is present in the polyurethane foam, the intumescent material can be present in the reactive composition comprising the polyurethane precursor composition prior to forming the polyurethane foam, or the intumescent material can be added post-processing to the foam, for example, by saturating the polyurethane foam with a liquid composition comprising the intumescent material. In this aspect, the intumescent material can penetrate the polyurethane material itself.

Alternatively, or in addition, a liquid composition comprising the intumescent material can penetrate the pores of the polyurethane material and coat or fill at least a portion of a surface of the pores, referred to herein as an "interior surface" for convenience. In this aspect, the coating or filling is conducted so as to not substantially adversely affect the desired properties of the foam, e.g., the compression force deflection or the compression set of the foam.

In another aspect where the intumescent material is present on at least one surface of the polyurethane foam, it is present on at least one exterior surface of the polyurethane foam. In this aspect the intumescent material can be added as a coating layer that is present on at least an exterior surface of the foam, and which may or may not penetrate the pores of the foam to coat an interior surface. The coating may be made, for example, by spray coating, dip coating, flow coating, roll coating, or the like. The coating layer on at least an outer surface of the foam can have a thickness of 5 micrometers for 3 millimeters, or 25 to 250 micrometers. As stated above, it was surprisingly found that a coating layer is does not substantially adversely affect the desired properties of the foam, e.g., the compression force deflection or the compression set of the foam.

The intumescent material can be present in the reactive composition comprising the polyurethane precursor composition prior to forming the polyurethane foam, for example, in the frothed mixture 10. Conversely, the intumescent material can be added as a layer onto the formed polyurethane foam. For example, the intumescent material can be added after the heating zone by continuously feeding an intumescent composition 54 onto the polyurethane foam. The intumescent composition 54 can be spread to a layer of desired thickness by a doctoring blade 56 or other suitable spreading device. Conversely, (and not illustrated) the method can comprise traversing the polyurethane foam after the release liner(s) has been removed through a bath comprising the intumescent composition 54 prior to being wound on roll 40.

The intumescent material can be added to the polyurethane foam after the polyurethane foam has been formed into the desired shape of the battery pad. In this method, the intumescent composition can be deposited onto at least one surface of the polyurethane foam by at least one of spray coating, dip coating, painting, flow coating, or the like. It is noted that if the intumescent composition is deposited by an immersion method such a dip coating, then an increased amount of the intumescent composition can be present not only on a surface, but possibly within the foam.

The intumescent battery pad can have a thickness of 0.1 to 26 mm, or 0.1 to 15 mm or 0.3 to 10 mm, or 1 to 5 mm, or 5 to 6 mm. The polyurethane foam can have a thickness of 0.1 to 26 mm, or 0.1 to 15 mm or 0.3 to 10 mm, or 1 to 5 mm, or 5 to 6 mm. The thickness can be in the z-direction illustrated in FIG. 1.

The intumescent battery pad can have a density of 100 to 1,040 kilograms per meter cubed ($kg/m^3$), or 100 to 500, or 300 to 400 $kg/m^3$. The density can be determined in accordance with ASTM D3574-95, Test A.

The intumescent battery pad can have a compression force deflection at 25% deflection of 5 to 1,035 kilopascal (kPa), or 5 to 500 kPa, or 100 to 250 kPa, or 25 to 80 kPa. It is noted that the compression force deflection at 25% refers to the load that is required to physically compress the polyurethane foam by 25%. The intumescent battery pad can have a compression force deflection at 75% deflection of 50 to 1,050 kPa, or 100 to 500 kPa, or 200 to 300 kPa. As used herein the compression force deflection can be determined in accordance with ASTM D3574-17. The intumescent battery pad can have a SAG factor as defined by the compression force deflection at 65% divided by the compression force deflection at 25% of less than or equal to 3.

The intumescent battery pad can have a compression set at 50% deflection of 0 to 15%, or 0 to 5% as determined in accordance with ASTM D3574-95, Test D at 23° C. or 70° C.

An intumescent battery pad especially for use in a lithium ion battery can comprise a polyurethane foam having a compression force deflection of 5 to 1,035 kPa at 25% deflection determined in accordance with ASTM D3574-17; and an intumescent material comprising an acid source, a carbon source, and a blowing agent; wherein the intumescent battery pad has a UL-V0 rating at 1 mm. The battery pad can have a thickness of 1 to 5 mm. The compression force deflection can be 5 to 500 kPa, or 5 to 80 kPa at 25% deflection. The polyurethane can have a compression force deflection of 100 to 500 kPa, or 200 to 300 kPa at 75% deflection determined in accordance with ASTM D3574-17. The polyurethane can have a compression set at 50% deflection of 0 to 15%, or 0 to 5% as determined in accordance with ASTM D3574-95, Test D at 23° C. or 70° C. The polyurethane can have a SAG factor as defined by the compression force deflection at 65% divided by the compression force deflection at 25% of less than or equal to 3. The acid source can comprise at least one of an organic or inorganic phosphorous or a sulfate. The organic or inorganic phosphorous compound can comprise at least one of tris(2,3-dibromopropyl)phosphate, tris(2-chloroethyl)phosphate, tris(2,3-dichloropropyl)phosphate, tris(1-chloro-3-bromoisopropyl) phosphate, bis(1-chloro-3-bromoisopropyl)-1-chloro-3-bromoisopropyl phosphonate, polyaminotriazine phosphate, melamine phosphate, or guanylurea phosphate; an organophosphite ester; or a phosphorus-containing inorganic compound. The carbon source can comprise at least one of dextrin, a phenol-formaldehyde resin, pentaerythritol, a clay, or a polymer. The carbon source can include the polyurethane foam. The blowing agent can comprise at least one of a dicyandiamide, an azodicarbonamide, a melamine, a guanidine, a glycine, a urea, or a halogenated organic material. The blowing agent can decompose at a temperature of greater than or equal to 120° C., or 130 to 200° C. The intumescent material can further comprise at least one of a synergist or a binder. The intumescent material can be present on at least one surface of the polyurethane foam. The intumescent material can be dispersed in the polyurethane foam. The intumescent material can be located on all of the surfaces of the intumescent battery pad.

A battery assembly can comprise at least two battery cells; and the intumescent battery pad located in between the at least two battery cells. The battery can be a lithium ion battery.

The intumescent battery pad can be formed by coating a frothed composition comprising a reactive mixture onto a release liner; curing the reactive mixture to form a polyurethane foam. The frothed composition can comprise the intumescent material and/or the method can further comprise depositing an intumescent material on at least one surface of the polyurethane foam to form the intumescent battery pad. The coating the frothed composition can comprise depositing the frothed composition on the release liner at a deposition location; and wherein the curing the reactive mixture comprises translating frothed composition and the release liner through a heating zone to cure the reactive mixture and thereby forming the polyurethane foam. The depositing the intumescent material can comprise translating the polyurethane foam from the heating zone to an intumescent material deposition zone and depositing the intumescent material on the polyurethane foam. The depositing the intumescent material can comprise translating the polyurethane foam from the heating zone to an intumescent material dipping zone to provide the intumescent material on the polyurethane foam. The frothed composition can comprise the intumescent material.

The intumescent battery pad can be formed by depositing an intumescent material coating on the polyurethane foam. The depositing can comprise dip coating, flow coating, or spray coating.

The following examples are provided to illustrate the present disclosure. The examples are merely illustrative and are not intended to limit devices made in accordance with the disclosure to the materials, conditions, or process parameters set forth therein.

EXAMPLES

Example 1

Seven PORON brand polyurethane foams were cut into strips having a thickness of 3 mm. An intumescent paint was spread onto the broad surfaces of three of the polyurethane foams and three of the polyurethane foams were dip coated into an intumescent paint. The seventh polyurethane foam did not comprise the intumescent paint.

Figure 7:
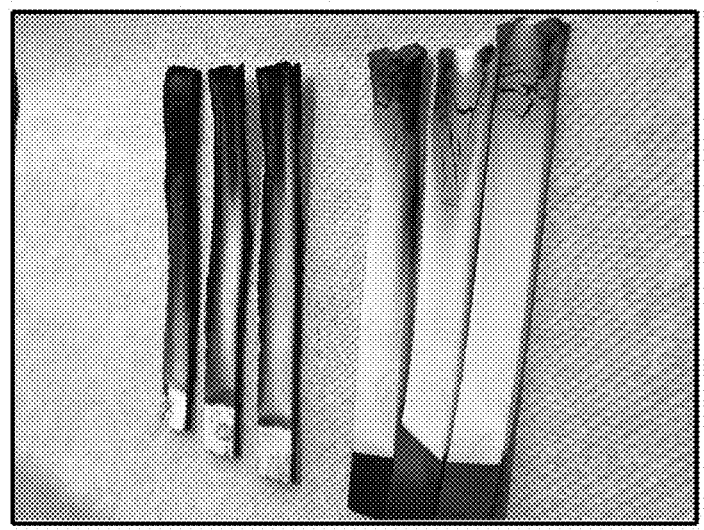
FIG. 7 is a photograph of the intumescent battery pads of Example 1.

The samples were then tested according to the Underwriter's Laboratory (UL)-94 flammability test at a thickness of 1 millimeter. FIG. 7 shows the samples after the flammability test, where the three polyurethane foams on the left were painted and the three polyurethane foams on the right were dip coated. The dip coated polyurethane foams achieved a UL-94 V0 rating and show a relatively small amount of char at the top of the foams. The painted polyurethane foams achieved a UL-94 V1 rating, where FIG. 7 shows some charring, especially towards the top of the foams. This increased charring relative to the dip coated foams is due to the fact that the edges of the foam were not coated with the paint. The seventh polyurethane foam that was not coated with the intumescent paint burned completely.

Set forth below are various non-limiting aspects of the disclosure.

Aspect 1: An intumescent battery pad for a lithium ion battery, comprising: a polyurethane foam having a compression force deflection of 5 to 1,035 kilopascal at 25% deflection determined in accordance with ASTM D3574-17; and an intumescent material comprising an acid source, a carbon source, and a blowing agent; wherein the intumescent battery pad has a UL-V0 rating at a thickness of 1 millimeter.

Aspect 2: The intumescent battery pad of aspect 1, wherein the intumescent battery pad has a thickness of 1 to 5 millimeter.

Aspect 3: The intumescent battery pad of any one or more of the preceding aspects, wherein the polyurethane foam has at least one of the compression force deflection of 5 to 500 kPa, or 5 to 80 kPa each at 25% deflection determined in accordance with ASTM D3574-17; a compression force deflection of 100 to 500 kPa, or 200 to 300 kPa each at 75% deflection determined in accordance with ASTM D3574-17; a compression set at 50% deflection of 0 to 15%, or 0 to 5% as determined in accordance with ASTM D3574-95, Test D at 23° C. or 70° C.; or a SAG factor as defined by the compression force deflection at 65% divided by the compression force deflection at 25% of less than or equal to 3.

Aspect 4: The intumescent battery pad of any one or more of the preceding aspects, wherein the acid source comprises at least one of an organic or inorganic phosphorous or a sulfate (for example, ammonium sulfate); wherein the organic or inorganic phosphorous compound can comprise at least one of tris(2,3-dibromopropyl)phosphate, tris(2-chloroethyl)phosphate, tris(2,3-dichloropropyl)phosphate, tris(1-chloro-3-bromoisopropyl) phosphate, bis(1-chloro-3-bromoisopropyl)-1-chloro-3-bromoisopropyl phosphonate, polyaminotriazine phosphate, melamine phosphate, or guanylurea phosphate; an organophosphite ester; or a phosphorus-containing inorganic compound.

Aspect 5: The intumescent battery pad of any one or more of the preceding aspects, wherein the carbon source comprises at least one of dextrin, a phenol-formaldehyde resin, pentaerythritol (for example, a dimer or trimer thereof), a clay, or a polymer (for example, polyamide 6 or the polyurethane foam).

Aspect 6: The intumescent battery pad of any one or more of the preceding aspects, wherein the blowing agent comprises at least one of a dicyandiamide, an azodicarbonamide, a melamine, a guanidine, a glycine, a urea (for example, a urea-formaldehyde resin or a methylolated guanylurea phosphate), or a halogenated organic material (for example, a chlorinated paraffin).

Aspect 7: The intumescent battery pad of any one or more of the preceding aspects, wherein the blowing agent decomposes at a temperature of greater than or equal to 120° C., or 130 to 200° C.

Aspect 8: The intumescent battery pad of any one or more of the preceding aspects, wherein the intumescent material further comprises at least one of a synergist or a binder.

Aspect 9: The intumescent battery pad of any one or more of the preceding aspects, wherein the intumescent material is present on at least one surface of the polyurethane foam.

Aspect 10: The intumescent battery pad of any one or more of the preceding aspects, wherein the intumescent material is dispersed in the polyurethane foam.

Aspect 11: The intumescent battery pad of any one or more of the preceding aspects, wherein the intumescent material is located on all of the surfaces of the intumescent battery pad.

Aspect 12: A battery comprising: at least two battery cells; and the intumescent battery pad of any one or more of the preceding aspects located in between the at least two battery cells.

Aspect 13: The battery of Aspect 12, wherein the battery is a lithium ion battery.

Aspect 14: A method of making the intumescent battery pad (for example, of any one or more of Aspects 1 to 11), comprising: coating a frothed composition comprising a reactive mixture onto a release liner; curing the reactive mixture to form the polyurethane foam; and wherein the frothed composition comprises the intumescent material, or wherein the method further comprises depositing the intumescent material on at least one surface of the polyurethane foam to form the intumescent battery pad.

Aspect 15: The method of Aspect 14, wherein the coating the frothed composition comprises depositing the frothed composition on the release liner at a deposition location; and wherein the curing the reactive mixture comprises translating frothed composition and the release liner through a heating zone to cure the reactive mixture and form the polyurethane foam.

Aspect 16: The method of Aspect 15, wherein the depositing the intumescent material comprises translating the polyurethane foam from the heating zone to an intumescent material deposition zone and depositing the intumescent material on the polyurethane foam.

Aspect 17: The method of Aspect 15, wherein the depositing the intumescent material comprises translating the polyurethane foam from the heating zone to an intumescent material dipping zone to provide the intumescent material on the polyurethane foam.

Aspect 18: The method of any one or more of Aspects 14 to 17, wherein the frothed composition comprises the intumescent material.

Aspect 19: A method of making the intumescent battery pad (for example, of any one or more of Aspects 1 to 11), comprising depositing the intumescent material on the polyurethane foam.

Aspect 20: The method of Aspect 19, wherein the depositing comprises dip coating, flow coating, or spray coating.

Aspect 21: A battery assembly, comprising: at least two battery cells and an intumescent battery pad (for example, of any of Aspects 1 to 11), located in between the at least two battery cells or along a surface proximate to the battery assembly; wherein the intumescent battery pad comprises a polyurethane foam and an intumescent material layer on the polyurethane foam.

Aspect 22: The battery assembly of Aspect 21, wherein the intumescent material layer is located on all exterior surfaces of the polyurethane foam.

Aspect 23: The battery assembly of any of Aspects 21 to 22, wherein the intumescent material layer is present on at least one exterior surface of the polyurethane foam.

Aspect 24: The battery assembly of any of Aspects 21 to 23, wherein the polyurethane foam has a thickness of 1 to 5 millimeters.

Aspect 25: The battery assembly of any of Aspects 21 to 24, where the polyurethane foam has a thickness of 1 to 5 millimeter; and the intumescent material layer has a thickness of 25 to 250 micrometers.

Aspect 26: The battery assembly of any of Aspects 21 to 25, wherein a thickness of the intumescent material layer is less than a thickness of the polyurethane layer; and wherein the intumescent material layer has a thickness of 5 micrometers for 3 millimeters.

Aspect 27: The battery assembly of any of Aspects 21 to 26, wherein the intumescent battery pad and at least one of the battery cells each have the same perimeter shape.

Aspect 28: The battery assembly of any of Aspects 21 to 27, wherein the intumescent battery pad and the at least two battery cells each have the same perimeter shape and perimeter size.

Aspect 29: The battery assembly of any of Aspects 21 to 28, wherein the intumescent battery pad and at least one of the battery cells have a different perimeter shape along at least a portion of the perimeter of the intumescent battery pad.

Aspect 30: The battery assembly of any of Aspects 21 to 29, wherein the battery assembly comprises a stack of 2 to 100, or 10 to 50 battery cells, wherein the intumescent battery pad is located in between each of the battery cells in the stack.

Aspect 31: A battery comprising the battery assembly of any of Aspects 21 to 30.

Aspect 32: The battery of Aspect 31, wherein the battery assembly is located in a housing; wherein a foam layer is located on a first side of the battery assembly in the housing and a thermal management assembly is located on a second side of the battery assembly; wherein the thermal management assembly comprises a thermal interface layer and a cooling plate.

Aspect 33: The battery of Aspect 31 or 32, wherein the battery is a lithium ion battery.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced item. The term "or" means "and/or" unless clearly indicated otherwise by context. Reference throughout the specification to "an aspect", "an embodiment", "another embodiment", "some embodiments", and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.). The terms "first," "second," and the like, "primary," "secondary," and the like, as used herein do not denote any order, quantity, or importance, but rather are used to distinguish one element from another. The term "combinations comprising at least one of the foregoing" or "at least one of" means that the list is inclusive of each element individually, as well as combinations of two or more elements of the list, and combinations of at least one element of the list with like elements not named. Also, the term "combination" is inclusive of blends, mixtures, alloys, reaction products, and the like.

Unless defined otherwise, technical and scientific terms used herein have the same meaning as is commonly understood by one of skill in the art to which this disclosure belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An intumescent battery pad for a lithium ion battery, comprising:
   a polyurethane foam having a compression force deflection of 5 to 1,035 kilopascal at 25% deflection determined in accordance with ASTM D3574-17; and
   an intumescent material comprising an acid source, a carbon source, and a blowing agent;
   wherein the intumescent battery pad has a UL-V0 rating at a thickness of 1 millimeter, and
   wherein the intumescent material is present as a coating layer having a thickness of 25 to 250 micrometers on at least an exterior surface of the foam.

2. The intumescent battery pad of claim 1, wherein the intumescent battery pad has a thickness of 1 to 5 millimeters.

3. The intumescent battery pad of claim 1, wherein the polyurethane foam has at least one of
   the compression force deflection of 5 to 500 kPa at 25% deflection determined in accordance with ASTM D3574-17;
   a compression force deflection of 100 to 500 kPa at 75% deflection determined in accordance with ASTM D3574-17;
   a compression set at 50% deflection of 0 to 15% as determined in accordance with ASTM D3574-95, Test D at 23° C. or 70° C.; or
   a SAG factor as defined by the compression force deflection at 65% divided by the compression force deflection at 25% of less than or equal to 3.

4. The intumescent battery pad of claim 1, wherein the acid source comprises at least one of an organic or inorganic phosphorous or a sulfate;
   wherein the organic or inorganic phosphorous compound comprises at least one of tris(2,3-dibromopropyl)phosphate, tris(2-chloroethyl)phosphate, tris(2,3-dichloropropyl)phosphate, tris(1-chloro-3-bromoisopropyl) phosphate, bis(1-chloro-3-bromoisopropyl)-1-chloro-3-bromoisopropyl phosphonate, polyaminotriazine phosphate, melamine phosphate, or guanylurea phosphate; an organophosphite ester; or a phosphorus-containing inorganic compound.

5. The intumescent battery pad of claim 1, wherein the carbon source comprises at least one of dextrin, a phenol-formaldehyde resin, pentaerythritol, a clay, or a polymer.

6. The intumescent battery pad of claim 1, wherein the blowing agent comprises at least one of a dicyandiamide, an azodicarbonamide, a melamine, a guanidine, a glycine, a urea, or a halogenated organic material.

7. The intumescent battery pad of claim 1, wherein the blowing agent decomposes at a temperature of greater than or equal to 120° C.

8. The intumescent battery pad of claim 1, wherein the intumescent material further comprises at least one of a synergist or a binder.

9. The intumescent battery pad of claim 1, wherein the intumescent material is located on all of the surfaces of the intumescent battery pad.

10. The intumescent battery pad of claim 1, wherein the polyurethane foam has
    the compression force deflection of 5 to 500 kPa at 25% deflection determined in accordance with ASTM D3574-17;
    a compression force deflection of 100 to 500 kPa at 75% deflection determined in accordance with ASTM D3574-17;
    a compression set at 50% deflection of 0 to 15% as determined in accordance with ASTM D3574-95, Test D at 23° C. or 70° C.; and
    a SAG factor as defined by the compression force deflection at 65% divided by the compression force deflection at 25% of less than or equal to 3.

11. A method of making the intumescent battery pad of claim 1, comprising:
    coating a frothed composition comprising a reactive mixture onto a release liner;
    curing the reactive mixture to form the polyurethane foam; and
    wherein the frothed composition comprises the intumescent material, or wherein the method further comprises depositing the intumescent material on at least one surface of the polyurethane foam to form the intumescent battery pad.

12. The method of claim 11, wherein the coating the frothed composition comprises depositing the frothed composition on the release liner at a deposition location; and wherein the curing the reactive mixture comprises translating frothed composition and the release liner through a heating zone to cure the reactive mixture and form the polyurethane foam.

13. The method of claim 12, wherein the depositing the intumescent material comprises translating the polyurethane foam from the heating zone to an intumescent material deposition zone and depositing the intumescent material on the polyurethane foam.

14. The method of claim 12, wherein the depositing the intumescent material comprises translating the polyurethane foam from the heating zone to an intumescent material dipping zone to provide the intumescent material on the polyurethane foam.

15. The method of claim 12, wherein the frothed composition comprises the intumescent material.

16. A method of making the intumescent battery pad of claim 1, comprising depositing the intumescent material on the polyurethane foam.

17. The method of claim 16, wherein the depositing comprises dip coating, flow coating, or spray coating.

18. A battery comprising:
   at least two battery cells; and
   an intumescent battery pad located in between the at least two battery cells;
   wherein the intumescent battery pad comprises a polyurethane foam and an intumescent material; wherein the polyurethane foam has a compression force deflection of 5 to 1,035 kilopascal at 25% deflection determined in accordance with ASTM D3574-17; and
   wherein the intumescent material comprises an acid source, a carbon source, and a blowing agent;
   wherein the intumescent battery pad has a UL-V0 rating at a thickness of 1 millimeter, and
   wherein the intumescent material is present as a coating layer having a thickness of 25 to 250 micrometers on at least an exterior surface of the foam.

19. The battery of claim 18, wherein the battery is a lithium ion battery for a vehicle.

20. The battery of claim 18, wherein the polyurethane foam has
   the compression force deflection of 5 to 500 kPa at 25% deflection determined in accordance with ASTM D3574-17;
   a compression force deflection of 100 to 500 kPa at 75% deflection determined in accordance with ASTM D3574-17;
   a compression set at 50% deflection of 0 to 15% as determined in accordance with ASTM D3574-95, Test D at 23° C. or 70° C.; and
   a SAG factor as defined by the compression force deflection at 65% divided by the compression force deflection at 25% of less than or equal to 3.

* * * * *